(12) United States Patent
Lewandowski et al.

(10) Patent No.: US 12,545,253 B2
(45) Date of Patent: Feb. 10, 2026

(54) ADAPTIVE CRUISE CONTROL EXTENDED AUTO-RESUME FOR NON-CONTROLLED-ACCESS ROADWAYS

(71) Applicant: Ford Global Technologies, LLC, Dearborn, MI (US)

(72) Inventors: Andrew Denis Lewandowski, Sterling Heights, MI (US); Keith Weston, Canton, MI (US); Brendan Francis Diamond, Grosse Pointe, MI (US); Jordan Barrett, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 666 days.

(21) Appl. No.: 17/499,953

(22) Filed: Oct. 13, 2021

(65) Prior Publication Data

US 2023/0110101 A1     Apr. 13, 2023

(51) Int. Cl.
*B60W 30/14*     (2006.01)
*B60W 40/04*     (2006.01)
(Continued)

(52) U.S. Cl.
CPC .......... *B60W 30/143* (2013.01); *B60W 40/04* (2013.01); *B60W 40/105* (2013.01);
(Continued)

(58) Field of Classification Search
CPC ............................. B60W 30/10; B60W 50/16
See application file for complete search history.

(56) References Cited

U.S. PATENT DOCUMENTS 9,272,711 B1 *   3/2016   Sivaraman ............. G08G 1/163
2004/0010362 A1   1/2004   Michi et al.
(Continued)

FOREIGN PATENT DOCUMENTS

DE          10349434 A1     6/2004

OTHER PUBLICATIONS

YouTube. (2017). Mercedes-Benz S-Class 2017: Active Distance Assist Distronic—Extended automatic re-start. YouTube. Retrieved May 31, 2023, from https://www.youtube.com/watch?v=9SdorVb3adE. (Year: 2017).*

(Continued)

*Primary Examiner* — Wade Miles
*Assistant Examiner* — Jerrod Irvin Davis
(74) *Attorney, Agent, or Firm* — Frank A. MacKenzie; Brooks Kushman P.C.

(57) ABSTRACT

A system comprises a computer having a processor and a memory, the memory storing instructions executable by the processor to determine, as a vehicle travels along a roadway while an adaptive cruise control feature of the vehicle is active, that the roadway is a non-controlled-access roadway, detect a presence of traffic congestion impeding travel of the vehicle along the non-controlled-access roadway, responsive to detecting the presence of the traffic congestion, generate a prompt for driver input indicating whether the adaptive cruise control feature is to enter an extended auto-resume (XAR) mode, and cause the adaptive cruise control feature to enter the XAR mode based on driver input indicating that the adaptive cruise control feature is to enter the XAR mode.

20 Claims, 6 Drawing Sheets

(51) Int. Cl.
*B60W 40/105* (2012.01)
*B60W 50/14* (2020.01)
*B60W 50/16* (2020.01)
*G06V 20/58* (2022.01)

(52) U.S. Cl.
CPC .......... *B60W 50/16* (2013.01); *G06V 20/584* (2022.01); *B60W 2050/143* (2013.01); *B60W 2050/146* (2013.01); *B60W 2554/406* (2020.02); *B60W 2555/60* (2020.02); *B60W 2556/10* (2020.02); *B60W 2556/45* (2020.02)

(56) References Cited

U.S. PATENT DOCUMENTS

| | | | | |
|---|---|---|---|---|
| 2009/0299598 | A1* | 12/2009 | Boecker | B60W 30/18018 |
| | | | | 701/96 |
| 2017/0043774 | A1* | 2/2017 | Kelly | F16H 61/0213 |
| 2018/0190128 | A1* | 7/2018 | Saigusa | B60W 40/04 |
| 2018/0319402 | A1 | 11/2018 | Mills et al. | |
| 2019/0047585 | A1* | 2/2019 | Kagerer | B60W 30/143 |
| 2019/0351905 | A1* | 11/2019 | Maus | B60W 30/143 |
| 2020/0047771 | A1* | 2/2020 | Yoon | B60W 50/082 |
| 2020/0282991 | A1 | 9/2020 | Maus et al. | |
| 2021/0053572 | A1* | 2/2021 | Vasoya | G08G 1/0112 |

OTHER PUBLICATIONS

Daimler, "Intelligent Drive: Next-generation driving assistance systems", https://media.daimler.com; © 2021 Daimler AG.

\* cited by examiner

Storage Medium 600

Computer-Executable
Instructions for 500

ADAPTIVE CRUISE CONTROL EXTENDED AUTO-RESUME FOR NON-CONTROLLED-ACCESS ROADWAYS

BACKGROUND

Adaptive cruise control is a vehicle feature that, when engaged, controls vehicle propulsion power/acceleration in order to maintain a set speed when possible, while monitoring the road in front of the vehicle in order to detect other vehicles that may be present. When the adaptive cruise control feature detects the presence of a slower-moving vehicle in front of the controlled vehicle, it can reduce the speed of the controlled vehicle below the set speed in order to maintain a specified minimum following distance. Subsequently, if the adaptive cruise control feature detects that the road in front of the vehicle has become clear, it can cause the vehicle to accelerate back up to the set speed.

DETAILED DESCRIPTION

Disclosed herein are adaptive cruise control improvements according to which an extended auto-resume mode of an adaptive cruise control feature of a vehicle can be utilized while the vehicle travels on a non-controlled-access roadway. As the vehicle travels along the non-controlled-access roadway, it can monitor for the presence of traffic congestion based on captured images, average speed measurements, acceleration and deceleration counts, and/or other factors. If traffic congestion is detected, the vehicle can prompt a driver to indicate whether the adaptive cruise control feature should enter the extended auto-resume mode. Built-in hysteresis can be used to avoid excessively prompting the driver in circumstances in which traffic conditions are highly variable.

A system can comprise a computer having a processor and a memory, the memory storing instructions executable by the processor to determine, as a vehicle travels along a roadway while an adaptive cruise control feature of the vehicle is active, that the roadway is a non-controlled-access roadway, detect a presence of traffic congestion impeding travel of the vehicle along the non-controlled-access roadway, responsive to detecting the presence of the traffic congestion, generate a prompt for driver input indicating whether the adaptive cruise control feature is to enter an extended auto-resume (XAR) mode, and cause the adaptive cruise control feature to enter the XAR mode based on driver input indicating that the adaptive cruise control feature is to enter the XAR mode.

The memory can store instructions executable by the processor to determine that the roadway is the non-controlled-access roadway based on electronic horizon data for the vehicle.

The memory can store instructions executable by the processor to determine that the roadway is the non-controlled-access roadway based on geolocation data for the vehicle.

The memory can store instructions executable by the processor to detect the presence of the traffic congestion based on captured image data generated by an on-board camera of the vehicle.

The memory can store instructions executable by the processor to detect the presence of the traffic congestion based on crowdsourced traffic data received from a remote server.

The memory can store instructions executable by the processor to detect the presence of the traffic congestion based on vehicle speed data for the vehicle.

The memory can store instructions executable by the processor to determine an average speed of the vehicle over a time interval based on the vehicle speed data and detect the presence of the traffic congestion based on a comparison of the average speed with a threshold speed.

The memory can store instructions executable by the processor to determine the threshold speed based on a posted speed of the non-controlled-access roadway.

The memory can store instructions executable by the processor to determine a speed change count for the vehicle over a time interval based on the vehicle speed data and detect the presence of the traffic congestion based on a comparison of the speed change count with a threshold value.

The memory can store instructions executable by the processor to determine the threshold value based on a number of stoplights encountered by the vehicle during the time interval.

A method can comprise determining, as a vehicle travels along a roadway while an adaptive cruise control feature of the vehicle is active, that the roadway is a non-controlled-access roadway, detecting a presence of traffic congestion impeding travel of the vehicle along the non-controlled-access roadway, responsive to detecting the presence of the traffic congestion, generating a prompt for driver input indicating whether the adaptive cruise control feature is to enter an extended auto-resume (XAR) mode, and causing the adaptive cruise control feature to enter the XAR mode based on driver input indicating that the adaptive cruise control feature is to enter the XAR mode.

The method can comprise determining that the roadway is the non-controlled-access roadway based on electronic horizon data for the vehicle.

The method can comprise determining that the roadway is the non-controlled-access roadway based on geolocation data for the vehicle.

The method can comprise detecting the presence of the traffic congestion based on captured image data generated by an on-board camera of the vehicle.

The method can comprise detecting the presence of the traffic congestion based on crowdsourced traffic data received from a remote server.

The method can comprise detecting the presence of the traffic congestion based on vehicle speed data for the vehicle.

The method can comprise determining an average speed of the vehicle over a time interval based on the vehicle speed data and detecting the presence of the traffic congestion based on a comparison of the average speed with a threshold speed.

The method can comprise determining the threshold speed based on a posted speed of the non-controlled-access roadway.

The method can comprise determining a speed change count for the vehicle over a time interval based on the vehicle speed data and detecting the presence of the traffic congestion based on a comparison of the speed change count with a threshold value.

The method can comprise determining the threshold value based on a number of stoplights encountered by the vehicle during the time interval.

Figure 1:
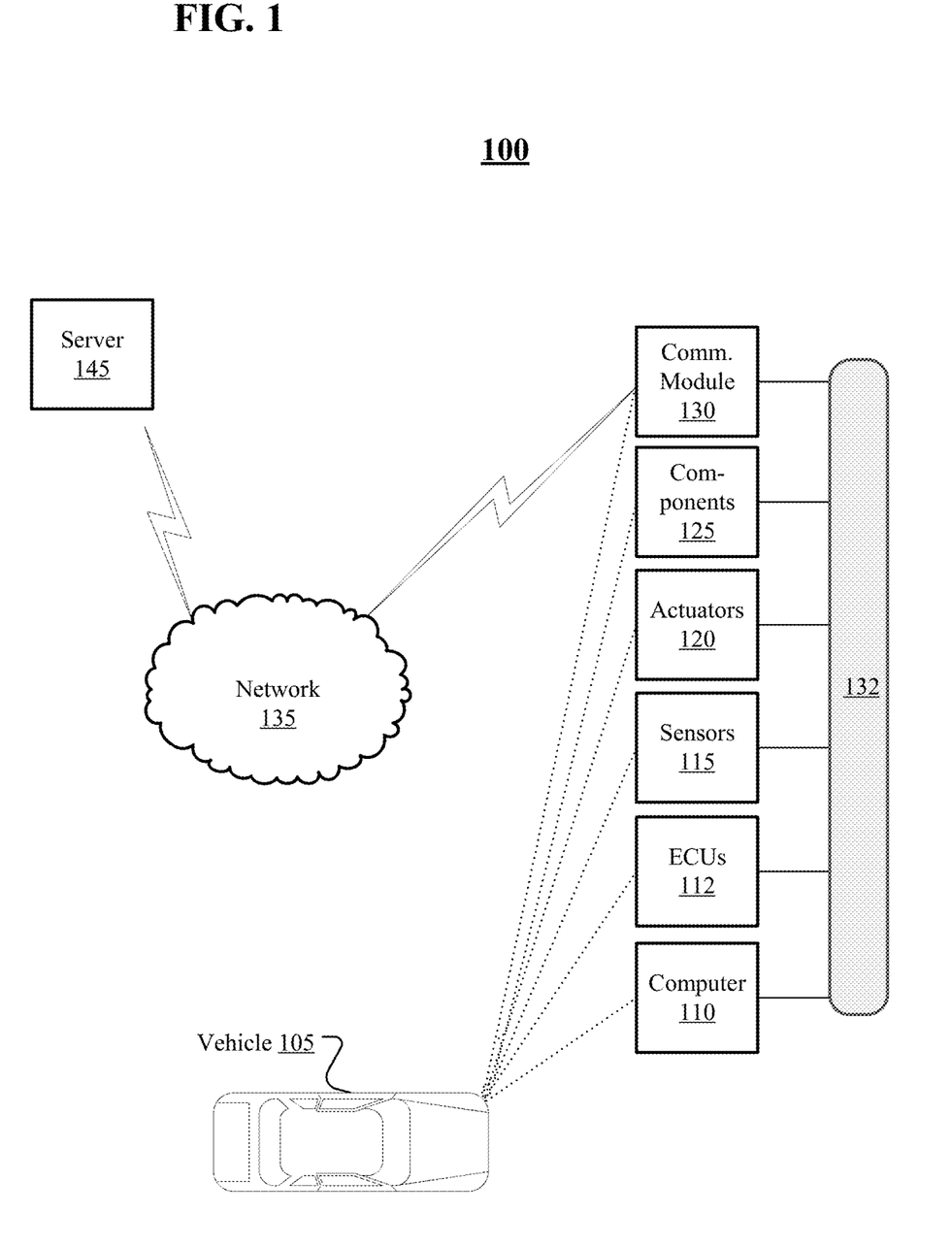
FIG. 1 is a block diagram of a first example system.

FIG. 1 is a block diagram of an example vehicle system 100. The system 100 includes a vehicle 105, which is a land vehicle such as a car, truck, etc. The vehicle 105 includes a computer 110, electronic control units (ECUs) 112, vehicle sensors 115, actuators 120 to actuate various vehicle components 125, a communications module 130, and a vehicle network 132. Communications module 130 allows vehicle 105 to communicate with a server 145 via a network 135.

The computer 110 includes a processor and a memory. The memory includes one or more forms of computer-readable media, and stores instructions executable by the processor for performing various operations, including as disclosed herein. The processor can be implemented using any suitable processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor, or any other suitable microprocessor or central processing unit (CPU). The processor also can be implemented as a dedicated processor, such as a controller, a microcontroller, an embedded processor, a chip multiprocessor (CMP), a co-processor, a graphics processor, a graphics processing unit (GPU), a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In some implementations, computer 110 can include multiple processors, each one of which can be implemented according to any of the examples above.

The computer 110 may operate vehicle 105 in an autonomous, a semi-autonomous mode, or a non-autonomous (manual) mode, i.e., can control and/or monitor operation of the vehicle 105, including controlling and/or monitoring components 125. For purposes of this disclosure, an autonomous mode is defined as one in which each of vehicle propulsion, braking, and steering are controlled by the computer 110; in a semi-autonomous mode the computer 110 controls one or two of vehicle propulsion, braking, and steering; in a non-autonomous mode a human operator controls each of vehicle propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may be communicatively coupled to, e.g., via vehicle network 132 as described further below, one or more processors located in other device(s) included in the vehicle 105. Further, the computer 110 may communicate, via communications module 130, with a navigation system that uses the Global Position System (GPS). As an example, the computer 110 may request and receive location data of the vehicle 105. The location data may be in a conventional format, e.g., geo-coordinates (latitudinal and longitudinal coordinates).

ECUs 112 (which can also be referred to as electronic control modules (ECMs) or simply as "control modules") are computing devices that monitor and/or control various vehicle components 125 of vehicle 105. Examples of ECUs 112 can include an engine control module, a transmission control module, a powertrain control module, a brake control module, a steering control module, and so forth. Any given ECU 112 can include a processor and a memory. The memory can include one or more forms of computer-readable media, and can store instructions executable by the processor for performing various operations, including as disclosed herein. The processor of any given ECU 112 can be implemented using a general-purpose processor or a dedicated processor or processing circuitry, including any of the examples identified above in reference to a processor included in computer 110.

In some implementations, the processor of a given ECU 112 can be implemented using a microcontroller. In some implementations, the processor of a given ECU 112 can be implemented using a dedicated electronic circuit including an ASIC that is manufactured for a particular operation, e.g., an ASIC for processing sensor data and/or communicating the sensor data. In some implementations, the processor of a given ECU 112 can be implemented using an FPGA, which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of general-purpose processor(s), ASIC(s), and/or FPGA circuits may be included in a given ECU 112.

Vehicle network 132 is a network via which messages can be exchanged between various devices in vehicle 105. Computer 110 can be generally programmed to send and/or receive, via vehicle network 132, messages to and/or from other devices in vehicle 105 (e.g., any or all of ECUs 112, sensors 115, actuators 120, components 125, communications module 130, a human machine interface (HMI), etc.). Additionally or alternatively, messages can be exchanged among various such other devices in vehicle 105 via vehicle network 132. In cases in which computer 110 actually comprises a plurality of devices, vehicle network 132 may be used for communications between devices represented as computer 110 in this disclosure. Further, as mentioned below, various controllers and/or vehicle sensors 115 may provide data to the computer 110.

In some implementations, vehicle network 132 can be a network in which messages are conveyed via a vehicle communications bus. For example, vehicle network can include a controller area network (CAN) in which messages are conveyed via a CAN bus, or a local interconnect network (LIN) in which messages are conveyed via a LIN bus.

In some implementations, vehicle network 132 can include a network in which messages are conveyed using other wired communication technologies and/or wireless communication technologies (e.g., Ethernet, WiFi, Bluetooth, etc.). Additional examples of protocols that may be used for communications over vehicle network 132 in some implementations include, without limitation, Media Oriented System Transport (MOST), Time-Triggered Protocol (TTP), and FlexRay.

In some implementations, vehicle network 132 can represent a combination of multiple networks, possibly of different types, that support communications among devices in vehicle 105. For example, vehicle network 132 can include a CAN in which some devices in vehicle 105 communicate via a CAN bus, and a wired or wireless local area network in which some device in vehicle 105 communicate according to Ethernet or Wi-Fi communication protocols.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles), etc., relative to the location of the vehicle 105. The vehicle sensors 115 may further include camera sensor(s) 115, e.g., front view, side view, rear view, etc., providing images from a field of view inside and/or outside the vehicle 105.

Actuators 120 are implemented via circuitry, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via communication module 130 with devices outside of the vehicle 105, e.g., through vehicle-to-vehicle (V2V) or vehicle-to-infrastructure (V2I) wireless communications to another vehicle, to (typically via the network 135) a remote server 145 (V2V and V2I may be collectively referred to as V2X). The communications module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) and cellular V2V (CV2V), cellular V2I or V2X (CV2X), etc.), local area networks (LAN) and/or wide area networks (WAN), including the Internet, providing data communication services.

Computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
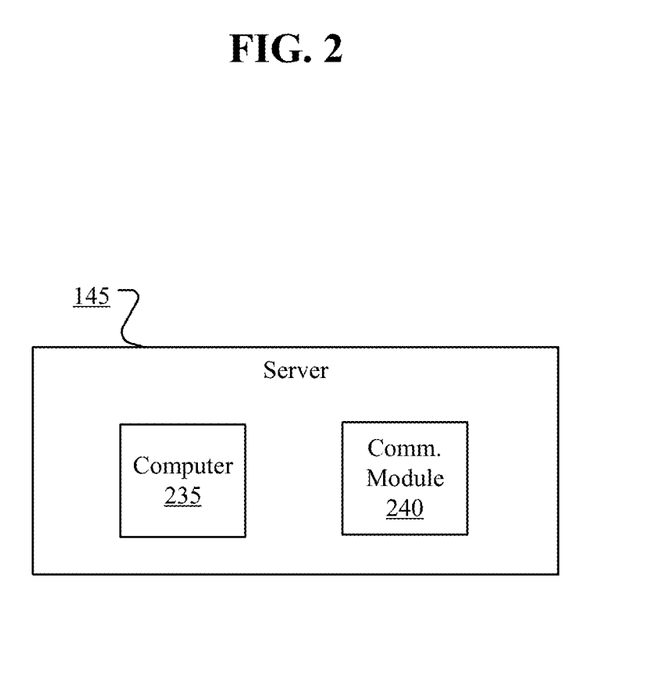
FIG. 2 is a block diagram of an example server.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 can include conventional mechanisms for wired and/or wireless communications, e.g., radio frequency communications using suitable protocols, that allow computer 235 to communicate with other devices, such as the vehicle 105, via wireless and or wired communication networks/links.

Figure 3:
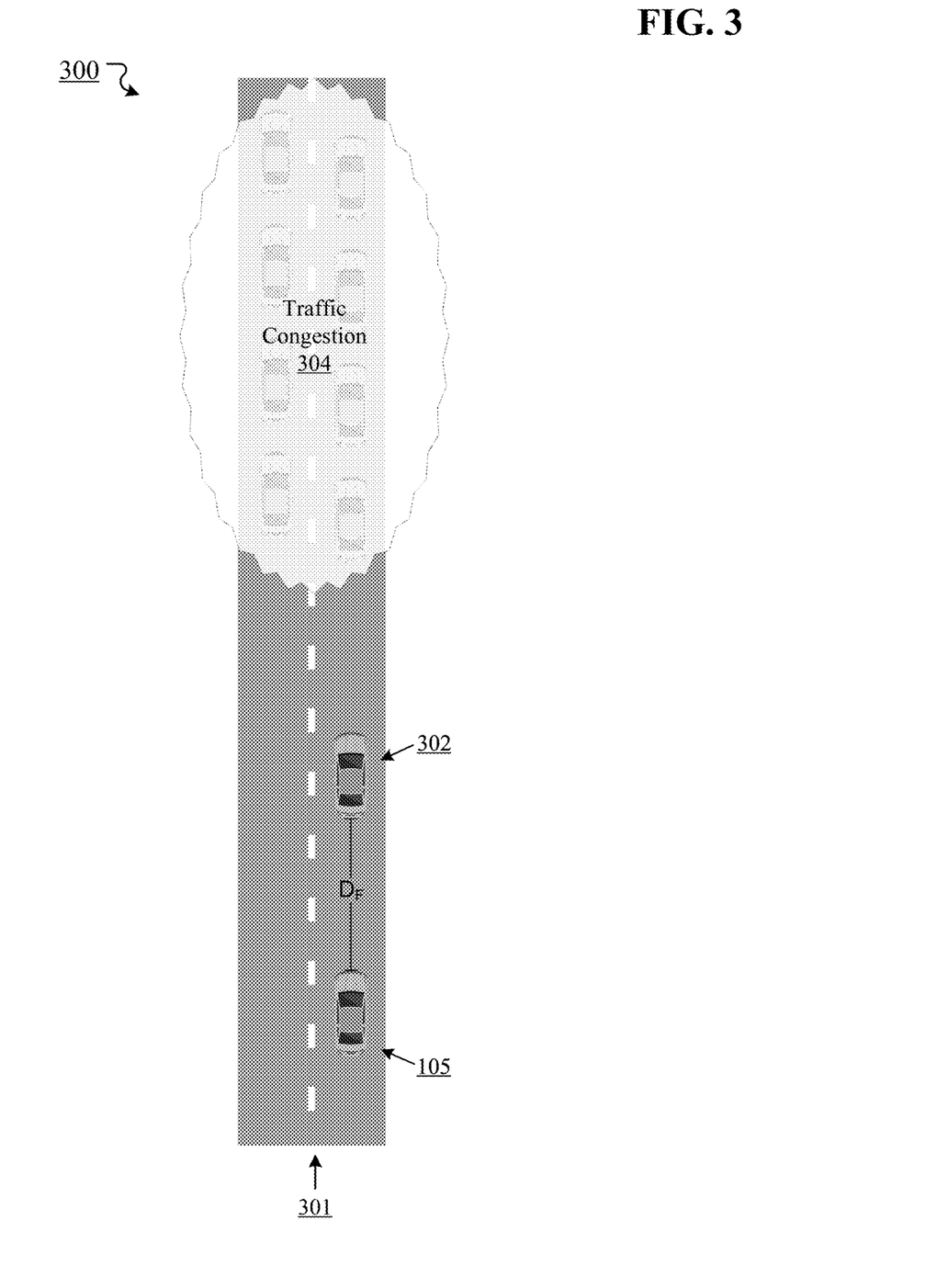
FIG. 3 is a diagram of an example traffic scene.

FIG. 3 is a diagram of an example traffic scene 300. In traffic scene 300, while an adaptive cruise control feature of vehicle 105 is engaged, vehicle 105 travels a roadway 301. While engaged, the adaptive cruise control feature of vehicle 105 can control vehicle propulsion power/acceleration in order to maintain a set speed when possible, while monitoring the road in front of vehicle 105 in order to detect other vehicles that may be present. The adaptive cruise control feature can monitor the road in front of vehicle 105 for the presence of other vehicle(s) based on sensor data provided by one or more sensors (e.g., one or more sensors 115).

In some implementations, the adaptive cruise control feature of vehicle 105 can use data provided by radar sensor(s) and camera(s) of vehicle 105 in order to detect the presence of other vehicles on roadway 301. In some implementations, using radar sensing data provided by radar sensor(s) of vehicle 105 (e.g., radar sensor(s) among sensors 115), radar-based object detection functionality of vehicle 105 (e.g., radar-based object detection functionality provided by computer 110 or an ECU 112) can detect objects (such as other vehicles) within range of those radar sensor(s). In some implementations, using images captured by camera(s) of vehicle 105 (e.g., camera(s) among sensors 115), image-based object detection functionality of vehicle 105 (e.g., image-based object detection functionality provided by computer 110 or an ECU 112) can visually detect/recognize objects (such as other vehicles) within visual range of those camera(s).

When the adaptive cruise control feature detects the presence of a vehicle in front of vehicle 105, it can determine whether vehicle 105, if it continues to travel at the set speed, will approach to within a specified minimum following distance from the detected vehicle. If so, the adaptive cruise control feature can temporarily reduce the speed of vehicle 105 below the set speed in order to prevent it from approaching any closer than the specified minimum following distance. In this context, the slower the speed of the leading vehicle in front of vehicle 105, the greater will be the extent to which the adaptive cruise control feature reduces the speed of vehicle 105. If the leading vehicle slows to a stop, the adaptive cruise control feature will cause vehicle 105 to also slow to a stop before it approaches closer than the specified minimum following distance.

In traffic scene 300, vehicle 105 travels roadway 301 with the adaptive cruise control feature engaged, and follows a vehicle 302. The adaptive cruise control feature controls engine power/acceleration at vehicle 105 in order to maintain, between vehicle 105 and vehicle 302, a specified minimum following distance. This specified minimum following distance can be a distance $D_F(s)$ that varies as a function of the speed of vehicle 105 (e.g., increases as the speed of vehicle 105 increases), and/or could be specified by user input, for example. Upon reaching traffic congestion 304 (e.g., a "traffic jam" consisting of stopped or slowly-moving vehicles), vehicle 302 may slow to a stop, and in turn, the adaptive cruise control feature of vehicle 105 may cause vehicle 105 to slow to a stop (e.g., preserving a distance $D_F(0)$ between the front of vehicle 105 and the back of vehicle 302).

The adaptive cruise control feature of vehicle 105 can include an "auto-resume" function that automatically resumes forward motion of vehicle 105 if the leading vehicle (vehicle 302) begins to move within a particular amount of time (an "auto-resume time", e.g., 3 seconds) after vehicle 105 slows to a stop. If the leading vehicle still has not moved when the auto-resume time elapses, the adaptive cruise control feature can defer resuming forward motion of vehicle 105 pending detection of manual driver input (e.g., the pressing of the gas pedal or a resume button on the steering wheel).

In some implementations, the auto-resume function can support an extended auto-resume (XAR) mode. In the XAR mode, forward motion of vehicle 105 can automatically be resumed if, after vehicle 105 slows to a stop, the leading vehicle (vehicle 302) begins to move within an extended amount of time (an "extended auto-resume time", e.g., 30 seconds) that is longer than the auto-resume time observed outside of the XAR mode (e.g., in a standard mode). If the leading vehicle still has not moved when the extended auto-resume time elapses, the adaptive cruise control feature can defer resuming forward motion of vehicle 105 pending detection of manual driver input (e.g., the pressing of the gas pedal or a resume button on the steering wheel).

In some implementations, the XAR mode can be made available under particular defined circumstances and/or conditions. In some implementations, for instance, the XAR mode can be made available when vehicle 105 travels on controlled-access roadways. As used herein, the term "controlled-access roadway" means a roadway that features physical separation (e.g., a dividing wall or strip) between traffic moving in opposite directions, does not cross at level with any road, railroad track, or footpath, and is restricted to use by motorized vehicles only. As vehicle 105 travels along roadway 301 while its adaptive cruise control feature is active, it may determine whether roadway 301 is a controlled-access roadway. Based on a determination that roadway 301 is a controlled-access roadway, the adaptive cruise control feature may determine that the XAR mode is available. The auto-resume function may then operate in the XAR mode, according to which automatically resumes forward motion of vehicle 105 if vehicle 302 begins to move within an extended auto-resume time of when vehicle 105 slowed to a stop. Operation in the XAR mode may provide an improved driving experience, by reducing the frequency with which the driver is forced to supply manual inputs in order to resume the forward motion of vehicle 105.

The XAR mode may have the potential to provide such an improved driving experience in scenarios involving travel on non-controlled-access roadways as well. As used herein, the term "non-controlled-access roadway" means a roadway that is not a controlled-access roadway. In some implementations, the XAR mode can be made available when vehicle 105 travels on non-controlled-access roadways, contingent upon driver input indicating a desire to utilize the XAR mode. In some implementations, the driver may be prompted for such input upon detection of conditions (e.g., the presence of traffic congestion) that are suited to use of the XAR mode. In the context of such an implementation, following a determination that roadway 301 is a non-controlled-access roadway, vehicle 105 may respond to detection of traffic congestion 304 by generating a prompt for driver input indicating whether the adaptive cruise control feature should enter the XAR mode. If driver input is received that indicates that the adaptive cruise control feature is to enter the XAR mode, the adaptive cruise control feature may do so, such that the auto-resume function implements an extended auto-resume time. Otherwise, the adaptive cruise control feature may refrain from entering the XAR mode, such that the auto-resume function implements a standard auto-resume time that is shorted than the extended auto-resume time.

Figure 4:
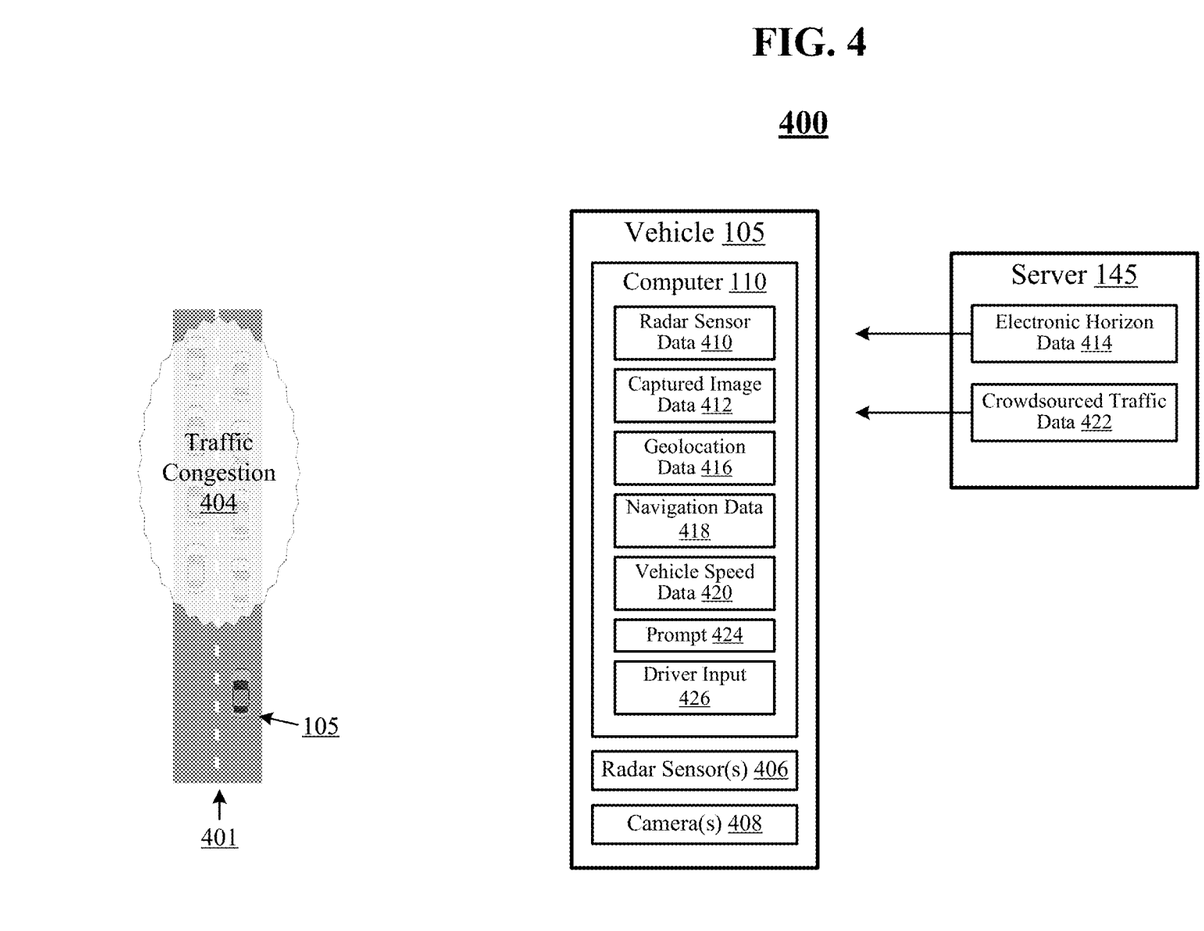
FIG. 4 is a block diagram of a second example system.

FIG. 4 is a block diagram of an example system 400 for adaptive cruise control extended auto-resume for non-controlled access roadways, which includes vehicle 105 and server 145 of FIG. 1. As illustrated in FIG. 4, vehicle 105 can include computer 110, one or more radar sensors 406, and one or more cameras 408. Computer 110 can implement/manage an adaptive cruise control feature of vehicle 105. While vehicle 105 navigates a non-controlled-access roadway 401 with its adaptive cruise control feature engaged, radar sensor(s) 406 and/or camera(s) 408 can provide computer 110 with radar sensor data 410 and/or captured image data 412, respectively. In conjunction with implementing/managing the adaptive cruise control feature of vehicle 105, computer 110 can access radar sensor data 410 for use in performing radar-based object detection, and/or can access captured image data 412 for use in performing image-based object detection. Via such radar-based object detection and/or image-based object detection, computer 110 can detect the presence of objects, such as other vehicles, on the roadway in front of vehicle 105, and can adjust the speed of vehicle 105 to account for the presence of such objects in executing the adaptive cruise control feature.

As vehicle 105 travels along non-controlled-access roadway 401 while an adaptive cruise control feature of vehicle 105 is active, computer 110 can determine whether vehicle 105 is traveling on a controlled-access (or non-controlled-access) roadway. In some implementations, computer 110 can perform this determination based on electronic horizon data 414 that may be available to the computer 110. Electronic horizon data 414 is a collection of data as is known obtained via vehicle sensors and/or stored map data indicating a current position or location of the vehicle 105 and predicting a future trajectory of the vehicle 105 with respect to an upcoming roadway, e.g., including road geometry, topology, and attributes (e.g., lanes, speed limits, etc.). Electronic horizon data 414 can be provided to vehicle 105 by server 145 (as depicted in FIG. 4) and/or can be provisioned to vehicle 105 in another way (e.g., OTA communications, on-site provisioning at a service center, etc.). In some implementations, computer 110 can identify a location of vehicle 105 based on geolocation data 416 (e.g., GPS coordinates) for vehicle 105, consult navigation data 418 to identify non-controlled-access roadway 401 as the roadway being traveled by vehicle 105 based on the geolocation of vehicle 105, and determine that non-controlled-access roadway 401 is a non-controlled-access roadway based on electronic horizon data 414.

As vehicle 105 travels along non-controlled-access roadway 401, computer 110 may detect a presence of traffic congestion 404 that impedes the travel of vehicle 105 along non-controlled-access roadway 401. In some implementations, computer 110 can detect the presence of traffic congestion 404 by analyzing captured image data 412 to look for visual evidence of traffic congestion. In some implementations, for example, computer 110 may detect the presence of traffic congestion 404 based on recognition, within captured image(s) corresponding to captured image data 412, of a long line of stopped or slowly-moving vehicles.

In some implementations, computer 110 can detect the presence of traffic congestion 404 by analyzing vehicle speed data 420. Vehicle speed data 420 is data indicating the speed of vehicle 105 as of each of a series/set of points in time. In some implementations, vehicle speed data 420 can comprise data provided by speed sensor(s) of vehicle 105. In some implementations, vehicle speed data 420 can consist of speeds observed/measured at periodic intervals (e.g., every tenth of a second).

In some implementations, computer 110 can determine an average speed of vehicle 105 over a time interval based on vehicle speed data 420, and can compare the average speed with a threshold speed. In some implementations, computer 110 can detect the presence of traffic congestion 404 based on a determination that the average speed is less than the threshold speed.

In some implementations, computer 110 can determine the threshold speed based on a posted speed limit of non-controlled-access roadway 401. In some implementations, computer 110 can determine the threshold speed by reducing the posted speed limit by a particular percentage (e.g., by reducing the posted speed limit by 50 percent) or value (e.g., by subtracting 30 mph from the posted speed limit).

In some implementations, computer 110 can determine a speed change count for vehicle 105 over a time interval based on vehicle speed data 420. The speed change count indicates a number of decelerations and accelerations performed by vehicle 105 over the course of the time interval. In some implementations, computer 110 can detect the presence of traffic congestion 404 based on a comparison of the speed change count with a threshold value. In some implementations, the threshold value can represent an estimated number of decelerations and accelerations that vehicle 105 would be expected to perform if traversing the relevant portion of non-controlled-access roadway 401 (that portion traversed during the time interval in question) in the absence of traffic congestion. In some implementations, computer 110 can determine the threshold value based on a number of stoplights encountered by vehicle 105 during the time interval.

In some implementations, computer 110 can detect the presence of traffic congestion 404 based on a determination that the speed change count exceeds the threshold value. In some implementations, computer 110 can detect the presence of traffic congestion 404 based on such a determination without consideration of whether the average speed of vehicle 105 exceeds a threshold speed. In some other implementations, computer 110 can detect the presence of traffic congestion 404 based both on a determination that the average speed of vehicle 105 exceeds a threshold speed and on a determination that the speed change count for vehicle 105 exceeds a threshold value.

In some implementations, computer 110 can detect the presence of traffic congestion 404 based on traffic data received from one or more external sources. In some implementations, for instance, computer 110 can detect the presence of traffic congestion 404 based on crowdsourced traffic data 422 received from server 145. Crowdsourced traffic data 422 is data indicating traffic density and/or traffic speed on non-controlled-access roadway 401 in the vicinity of vehicle 105 as observed from/by other vehicles traveling along non-controlled-access roadway 401. In some implementations, crowdsourced traffic data 422 can include traffic data generated by crowdsource traffic applications executing at/in such other vehicles (e.g., on mobile devices of the drivers of such other vehicles). In some implementations, in addition to, or in lieu of crowdsourced traffic data 422, vehicle 105 can receive traffic data from one or more nearby vehicles via V2V communications, and can detect the presence of traffic congestion 404 based on such traffic data.

Having determined that vehicle 105 is traveling on a non-controlled-access roadway, and responsive to detecting the presence of traffic congestion 404 that impedes the travel of vehicle 105 along that non-controlled-access roadway (non-controlled-access roadway 401), computer 110 can generate a prompt 424 for driver input indicating whether the adaptive cruise control feature of vehicle 105 is to enter the XAR mode. Prompt 424 can, for instance, take the form of a visual cue (e.g., text, symbol, icon, etc.) presented on a human-machine interface (HMI) of vehicle 105, an aural cue (e.g., a chime, simulated speech, etc.), a tactile cue (e.g., steering wheel or accelerator pedal vibration), a combination of more than one of the preceding, or another form.

A driver of vehicle 105 can respond to prompt 424 by providing driver input 426 that indicates that the adaptive cruise control feature of vehicle 105 is to enter the XAR mode. Based on that driver input 426, computer 110 can cause the adaptive cruise control feature of vehicle 105 to enter the XAR mode. As discussed above, in the XAR mode, an extended auto-resume time can be implemented that is longer than an auto-resume time observed outside of the XAR mode (e.g., in a standard mode). For instance, in some implementations, a 3 second auto-resume time can be observed in a standard mode, and a 30 second extended auto-resume time can be observed in the XAR mode.

In some implementations, computer 110 can use average speeds computed based on vehicle speed data 420 to as bases for enabling and disabling the XAR mode subsequent to entering the XAR mode in response to driver input 426. In some implementations, as vehicle 105 travels along non-controlled-access roadway 401 with the XAR mode activated, computer 110 can monitor average speeds of vehicle 105 and compare them with posted speed limits of non-controlled-access roadway 401. In some implementations, if the average speed of vehicle 105 is within a certain range (e.g., a percentage or a number of mph) of the posted speed limit for a certain continuous number of seconds, computer 110 can cause the adaptive cruise control feature to exit the XAR mode. In some implementations, if the average speed of vehicle 105 is subsequently outside the certain range of the posted speed limit for the certain continuous number of seconds, computer 110 can cause the adaptive cruise control feature to re-enter the XAR mode without generating an additional driver prompt.

Figure 5:
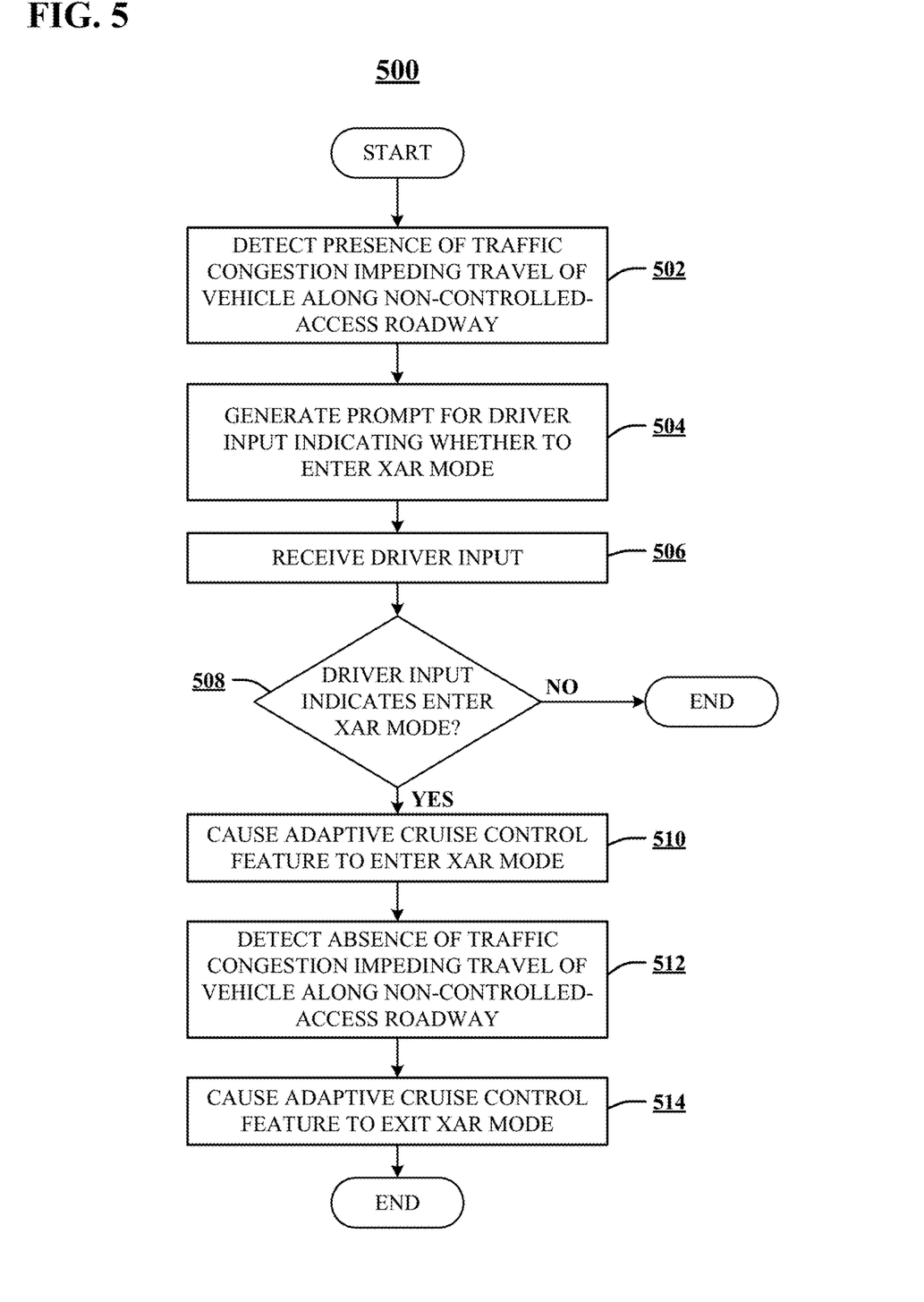
FIG. 5 is a block diagram of an example process flow.

FIG. 5 is a block diagram of a process flow 500, which may be representative of operations executed in various implementations. As shown in process flow 500, a presence of traffic congestion impeding travel of a vehicle along a non-controlled-access roadway can be detected at 502. For example, computer 110 can determine that non-controlled-access roadway 401 is a non-controlled-access roadway, and can detect the presence of traffic congestion 404 impeding the travel of vehicle 105 along non-controlled-access roadway 401. At 504, a prompt can be generated for driver input indicating whether an adaptive cruise control feature of the vehicle is to enter an XAR mode. For example, computer 110 can generate prompt 424, which can prompt a driver of vehicle 105 for input indicating whether the adaptive cruise control feature of vehicle 105 is to enter the XAR mode.

At 506, driver input can be received that indicates whether the adaptive cruise control feature of the vehicle is to enter the XAR mode. For example, computer 110 can receive driver input 426, which can indicate whether the adaptive cruise control feature of vehicle 105 is to enter the XAR mode. At 508, it can be determined whether the driver input received at 506 indicates that the adaptive cruise control feature of the vehicle is to enter the XAR mode. For example, computer 110 can determine whether driver input 426 indicates that the adaptive cruise control feature of vehicle 105 is to enter the XAR mode. If it is determined at 508 that the driver input received at 506 does not indicate that the adaptive cruise control feature of the vehicle is to enter the XAR mode, the process flow can end. If it is determined at 508 that the driver input received at 506 indicates that the adaptive cruise control feature of the vehicle is to enter the XAR mode, the process flow can continue at 510.

At 510, the adaptive cruise control feature of the vehicle can be caused to enter the XAR mode. For example, computer 110 can cause the adaptive cruise control feature of vehicle 105 to enter the XAR mode. Subsequently, at 512, an absence of traffic congestion impeding the travel of the vehicle along the non-controlled-access roadway can be detected (e.g., because the vehicle has passed beyond the congested area, has exited the non-controlled-access roadway, etc.). For example, once vehicle 105 has passed through traffic congestion 404, computer 110 can detect an absence of traffic congestion impeding the travel of vehicle 105 along non-controlled-access roadway 401. At 514, the adaptive cruise control feature of the vehicle can be caused to exit the XAR mode. For example, computer 110 can cause the adaptive cruise control feature of vehicle 105 to exit the XAR mode, which can result in the adaptive cruise control feature reverting to a standard mode in which a standard auto-resume time is observed that is less than and extended auto-resume time observed in the XAR mode (e.g., 3 seconds rather than 30 seconds). Following 514, the process flow can end.

Figure 6:
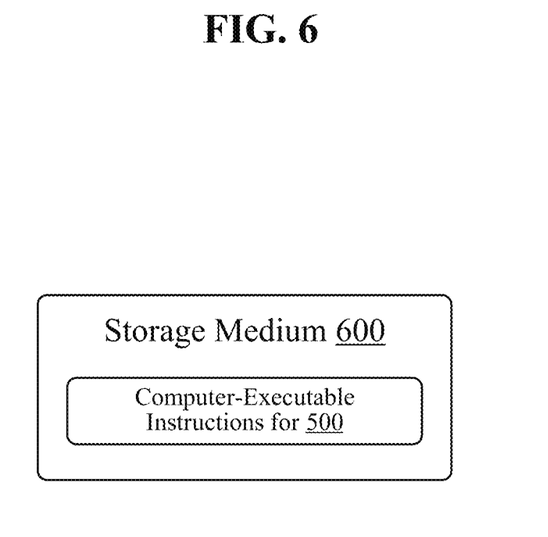
FIG. 6 is a block diagram of an example storage medium.

FIG. 6 illustrates an example storage medium 600. Storage medium 600 may be any non-transitory computer-readable storage medium or machine-readable storage medium, such as an optical, magnetic or semiconductor storage medium. In various implementations, storage medium 600 may be an article of manufacture. In some implementations, storage medium 600 may store computer-executable instructions, such as computer-executable instructions to implement process flow 500. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The present invention is intended to be limited only by the following claims.

What is claimed is:

1. A system, comprising:
   a computer having a processor and a memory, the memory storing instructions executable by the processor to:
   determine, as a vehicle travels along a roadway while an adaptive cruise control feature of the vehicle is active, that the roadway is a non-controlled-access roadway, wherein the adaptive cruise control feature includes an auto-resume time within which the vehicle, when stopped, automatically resumes forward motion when detecting resumption of motion forward of the vehicle;
   detect a presence of traffic congestion impeding travel of the vehicle along the non-controlled-access roadway;
   responsive to detecting the presence of the traffic congestion, generate a prompt for driver input indicating whether the adaptive cruise control feature is to enter an extended auto-resume (XAR) mode, wherein the XAR mode includes an increased auto-resume time; and
   cause the adaptive cruise control feature to enter the XAR mode based on driver input indicating that the adaptive cruise control feature is to enter the XAR mode, wherein the vehicle, when stopped, automatically resumes forward motion when detecting resumption of motion forward of the vehicle within the increased auto-resume time.

2. The system of claim 1, the memory storing instructions executable by the processor to determine that the roadway is the non-controlled-access roadway based on electronic horizon data for the vehicle.

3. The system of claim 1, the memory storing instructions executable by the processor to determine that the roadway is the non-controlled-access roadway based on geolocation data for the vehicle.

4. The system of claim 1, the memory storing instructions executable by the processor to detect the presence of the traffic congestion based on captured image data generated by an on-board camera of the vehicle.

5. The system of claim 1, the memory storing instructions executable by the processor to detect the presence of the traffic congestion based on crowdsourced traffic data received from a remote server.

6. The system of claim 1, the memory storing instructions executable by the processor to detect the presence of the traffic congestion based on vehicle speed data for the vehicle.

7. The system of claim 6, the memory storing instructions executable by the processor to:
determine an average speed of the vehicle over a time interval based on the vehicle speed data; and
detect the presence of the traffic congestion based on a comparison of the average speed with a threshold speed.

8. The system of claim 7, the memory storing instructions executable by the processor to determine the threshold speed based on a posted speed of the non-controlled-access roadway.

9. The system of claim 6, the memory storing instructions executable by the processor to:
determine a speed change count for the vehicle over a time interval based on the vehicle speed data; and
detect the presence of the traffic congestion based on a comparison of the speed change count with a threshold value.

10. The system of claim 9, the memory storing instructions executable by the processor to determine the threshold value based on a number of stoplights encountered by the vehicle during the time interval.

11. A method, comprising:
determining, as a vehicle travels along a roadway while an adaptive cruise control feature of the vehicle is active, that the roadway is a non-controlled-access roadway, wherein the adaptive cruise control feature includes an auto-resume time within which the vehicle, when stopped, automatically resumes forward motion when detecting resumption of motion forward of the vehicle;
detecting a presence of traffic congestion impeding travel of the vehicle along the non-controlled-access roadway;
responsive to detecting the presence of the traffic congestion, generating a prompt for driver input indicating whether the adaptive cruise control feature is to enter an extended auto-resume (XAR) mode, wherein the XAR mode includes an increased auto-resume time; and
causing the adaptive cruise control feature to enter the XAR mode based on driver input indicating that the adaptive cruise control feature is to enter the XAR mode, wherein the vehicle, when stopped, automatically resumes forward motion when detecting resumption of motion forward of the vehicle within the increased auto-resume time.

12. The method of claim 11, comprising determining that the roadway is the non-controlled-access roadway based on electronic horizon data for the vehicle.

13. The method of claim 11, comprising determining that the roadway is the non-controlled-access roadway based on geolocation data for the vehicle.

14. The method of claim 11, comprising detecting the presence of the traffic congestion based on captured image data generated by an on-board camera of the vehicle.

15. The method of claim 11, comprising detecting the presence of the traffic congestion based on crowdsourced traffic data received from a remote server.

16. The method of claim 11, comprising detecting the presence of the traffic congestion based on vehicle speed data for the vehicle.

17. The method of claim 16, comprising:
determining an average speed of the vehicle over a time interval based on the vehicle speed data; and
detecting the presence of the traffic congestion based on a comparison of the average speed with a threshold speed.

18. The method of claim 17, comprising determining the threshold speed based on a posted speed of the non-controlled-access roadway.

19. The method of claim 16, comprising:
determining a speed change count for the vehicle over a time interval based on the vehicle speed data; and
detecting the presence of the traffic congestion based on a comparison of the speed change count with a threshold value.

20. The method of claim 19, comprising determining the threshold value based on a number of stoplights encountered by the vehicle during the time interval.

* * * * *